United States Patent
Dice

(10) Patent No.: US 7,669,040 B2
(45) Date of Patent: Feb. 23, 2010

(54) METHOD AND APPARATUS FOR EXECUTING A LONG TRANSACTION

(75) Inventor: David Dice, Foxboro, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 569 days.

(21) Appl. No.: 11/640,018

(22) Filed: Dec. 15, 2006

(65) Prior Publication Data

US 2008/0148262 A1 Jun. 19, 2008

(51) Int. Cl.
*G06F 12/16* (2006.01)

(52) U.S. Cl. .......................... 712/225; 707/201; 710/5; 710/20; 710/21; 711/147

(58) Field of Classification Search ................ 707/201; 710/5, 20, 21; 711/141, 147; 712/225
See application file for complete search history.

(56) References Cited

U.S. PATENT DOCUMENTS

| 7,421,544 | B1* | 9/2008 | Wright et al. ............... 711/150 |
| 2004/0034673 | A1* | 2/2004 | Moir et al. .................. 707/204 |
| 2007/0260942 | A1* | 11/2007 | Rajwar et al. ................ 714/54 |
| 2008/0065864 | A1* | 3/2008 | Akkary et al. ............... 712/225 |
| 2008/0082804 | A1* | 4/2008 | Nightingale et al. ........ 712/235 |

OTHER PUBLICATIONS

Carlstrom et al., "The Atomos Transactional Programming Language", ACM/SIGPLAN Conference on Programming Language Design and Implementation, Jun. 10-16, 2006, pp. 1-13.*
Carlstrom et al., "Executing Java Programs with Transactional Memory", Science of Computer Programming, Elsevier, www.sciencedirect.com, Available online Aug. 4, 2006, pp. 111-129.*
Saha et al., "Architectural Support for Software Transactional Memory", Proceedings of the 39th Annual International Symposium on Microarchitecture, ACM, Dec. 9-13, 2006, pp. 185-196.*
Kumar et al., "Hybrid Transactional Memory", Proceedings of the 11th ACM/SIGPLAN Symposium on Principles of Parallel Programming, Mar. 29-31, 2006, pp. 209-220.*
Rajwar et al., "Virtualizing Transactional Memory", Proceedings of the 32nd Annual International Symposium on Computer Architecture, ACM, Jun. 4-8, 2005, pp. 494-505.*

* cited by examiner

*Primary Examiner*—William M Treat
(74) *Attorney, Agent, or Firm*—Park, Vaughan & Fleming LLP

(57) ABSTRACT

A system that executes a long transaction in a system with limited transactional hardware resources. During operation, the system executes the long transaction in a non transactional mode, which does not use transactional hardware resources. The system defers stores generated during the long transaction so that the stores are not committed to the architectural state of a processor until the transaction is successfully completed. If the long transaction successfully completes, the system commits the long transaction, which involves performing multiple hardware transactions to commit the deferred stores to the architectural state of the processor.

10 Claims, 12 Drawing Sheets

```
     m = Monitor(o);    // inflate on-demand
                        // We assume the Monitor-Object relationship is stable.
retry:
  // Monitor.Owner is encoded as follows:
  // LSB=0 -> Owner is either null (unlocked) or locked,
  //          in which case Owner is set to the ID of the
  //          the thread that acquired the lock.
  // LSB=1 -> The remain bits point to a pending commit buffer.
  //
  // As described above and for ease of explication a monitor instance
  // contains both an Owner field and a Version field.  The Version field
  // is used to detect concurrent modification and potential interference.
  // It is possible to collapse the Owner and Version fields into a single
  // machine word (OwnerVersion) using the following encoding:
  //  OwnerVersion:
  //  (Verison#,  00) = Unlocked
  //  (OwnerID,   01) = Locked for mutual exclusion.
  //                    The Version# is displaced and recorded by the
  //                    lock owner.  When the owner release the lock it will
  //                    atomically clear the "1" bit and store an
  //                    incremented Version# value.
  //  (CommitBuf,11)  = Unlocked with pending commit buffer.
  //                    CommitBuf points to the current pending commit
  //                    buffer.  The version# value is displaced and saved
  //                    in the commit buffer.  When the commit is finished
  //                    the thread completing the write-back phase will
  //                    atomically store the (Version#+1, 00) into the
  //                    OwnerVersion word.

w = m->Owner;
  if (W & 1) {
      // Help finish other pending or stalled writebacks
      // Loop until all no pending writebacks are visible.
      WriteBack (m);
      goto retry;
  }
  if (W != null) { // traditionally locked
      UseMutex:
      // Traditional locking path ...
      // Lock(m) uses CAS (&m->Owner, 0, Self) to try to acquire
      // the lock. if Lock(m) ever encounters a pending writeback it returns
      // a distinguished PENDINGCOMMIT indication.
      rslt = Lock(m);
      if (rslt == PENDINGCOMMIT) goto retry;
      assert m->Owner == Self;
      m->Version++;
      // Start of critical section . . .
      int v = o.a;
      o.a = v + 1;
      if (v & 1) {
          p.b++;
      }
  }
```

FIG. 2A

```
    // End of critical section . . .
    Unlock (m);
} else {
    // L-Transactional attempt . . .
    // Start by preparing the thread's commit buffer and
    // fetching the current Version value.
    if ( !txBegin (m) ) {
        goto retry ;
    }

// L-Transactionally fetch o.a.
    // To ensure that this thread sees a consistent
    // set of shared data values it re-checks m->Version after each
    // fetch of a global field. Fetch the datum and then
    // ratify that the set of observed values is coherent.
    int v = o.a;
    if ( !txconsistent() ) {
        txAbort(); goto retry;
    }
    // L-Transactionally store O.a.
    // Capture the address and value and save them in the
    // thread's commit buffer. This operation does *not*
    // update the master field.
    txStoreGlobal (&o. a, v+1);

if (v & 1) {
        tmp = txLoadGlobal(&p.b);
        if ( !txconsistent() ) {
            txAbort(); goto retry;
        }
        txStoreGlobal (&p.b, tmp+1);
    }

// Attempt to install the commitbuffer in the monitor
    // This "publishes" the values in the commit buffer.
    // Once installed, attempt to write-back the deferred
    // stores collected in the commit buffer.
    if ( !txTryCommit() ) {
        txAbort(); goto retry;
    }
}
```

FIG. 2B

```
// The transformed code employs the following runtime helper routines:

boolean txBegin(Monitor * m) {
    assert Self->LocalUndoLog->Cursor == 0 ; // undo log must be empty
    assert Self->CurrentTxn == null;
    if Self->cb == null
       Self->cb = AllocateCommitBuffer()
    Self->CurrentTxn = Self->cb;
    Self->Monitor = m;
    int v = m->Version;
    cb->Version = Self->Version = v;
    cb->Monitor = m;
    cb->Cursor = 0;
    cb->WritePos = 0;

// Verify that the fetched Version is consistent with Owner.
    // Critically, we fetch Version, Owner, and then resample Version.
    // Complementary code in Lock() sets Owner to non-null and
    // then increments Version.
    if (m->Owner != null) {
        Self->CurrentTxn = null;
        return false;
    }
    if (m->Version != v) {
        Self->CurrentTxn = null;
       return false;
    }
    return true;
} boolean txconsistent() {
    assert Self->CurrentTxn != null;

// Use a fence instruction to ensure that prior LDs (presumably
    // the load of a share variable) executes before the
    // subsequent LD of the monitor's Version field.
    MEMBAR (LoadLoad);

// Note that threads that acquire the lock will increment Version
    // *before* entering the critical section, so the following test
    // detects both locking operations that finished after this
    // thread started its L-transaction, and locking operations that
    // are currently in-progress.
    return Self->Version == Self->Monitor->Version;
}
```

FIG. 2C

```
txAbort() {
    assert Self-XurrentTxn != null;
    // Roll-back the changes in the LocalUndoLog
    // The LocalUndoLog records changes to thread-local variables
    Log * Log = Self->LocalUndoLog;
    for (i = 0; i < Log->Cursor; i++) {
        *(Log->AVList[i]. Addr) = Log->AVList[i].Valu;
    }
    Log->Cursor = 0;
    // Reset commit buffer to empty
    Self->cb->Cursor = 0 ;
    Self->CurrentTxn = null;
} txStoreGlobal (Addr,Valu) {
    assert Self-XurrentTxn != null ;
    // Store to a global field - capture the address and value
    // in the thread's private commit buffer.
    // To avoid write-after-write (WAW) hazards we capture
    // the values in chronological order. Optionally,
    // our implementation could squash older stores to the same address
    CommitBuffer * cb = Self->CurrentTxn;
    cb->AVList[cb->Cursor].Addr = Addr;
    cb->AvList[cb->Cursor].Valu = Valu;
    cb->Cursor ++;
} txStoreLocal (Addr,Value) {
    assert Self->CurrentTxn != null;
    // Store to a local field
    // fetch Currentvalue = *Addr
    // Add (Addr,CurrentValue) to Self->LocalUndoLog
    Log *Log = Self->LocalUndoLog;
    Log->AVList[Log->Cursor].Valu = *Addr;
    Log->AVList[Log->Cursor].Addr = Addr;
    Log->Cursor++;
    *Addr = Value
}
```

FIG. 2D

```
txLoadGlobal (Addr) {
    assert Self->CurrentTxn != null;
    // Load from a global field
    // Lookaside into the thread's commit buffer to try to satisfy the
    // load request - Avoid Read-After-Write (RAW) hazards and
    // maintain the illusion of processor consistency.
    // If the requested address appears in the thread's private
    // commit buffer return the value associated with the newest matching
    // address, otherwise return the value of the field itself.
    // Search from newest to oldest
    CommitBuffer * cb = Self->CurrentTxn;
    for ( i = cb->Cursor; --i >= 0; ) {
        if (cb->AVList[i].Addr == Addr) {
           return cb->AVList[i].Valu;
        }
    }
    // The value doesn't appear in the commitbuffer - return the
    // master copy.
    return *Addr
}
```

FIG. 2E

```
txTryCommit () {
    cb = Self->CurrentTxn;
    assert cb != null;
    if (cb->Cursor != 0) {
        // CommitBuffer is not empty
        int ver = cb->Version++;
        cb->WritePos = 0;
        Monitor * m = Self->Monitor;
        CHKPT ()
        void * Owner = m->Owner;
        if (ver != m->Version || Owner != null) {
            COMMIT();
            txAbort();
            return false;
        }
        m->Owner = cb | 1 ;   // indicate Owner contains pending commit
                              // buffer instead of a thread-id
        tmp = m->Swap;
        m->Swap = null;
        COMMIT();             // linearization point - pivot
        Self->cb = tmp;       // Self "donated" its cb to m, so try to steal
                              // one back
                              // This minimizes the number of CommitBuffers
                              // in circulation. This feature is not
                              // required - it's strictly an optimization.

// Our updates are committed (published), but not yet written
        // back.  This thread attempts to write its own changes back,
        // but if it stalls other threads will complete the write-back.
        // Strictly speaking the WriteBack() operation here is optional.
        // It's also acceptable to defer the writeback until the start
        // of another operation on the same monitor.
        WriteBack ()
    }

// Purge Self->LocalUndoLog, discard saved (addr,value) pairs
    Self->LocalUndoLog->Cursor = 0;
    // Reset commit buffer to empty
    Self->cb->Cursor = 0;
    Self->CurrentTxn = null;
    return true;
}
```

FIG. 2F

```
WriteBack (Monitor * m)
    // Decompose a pending write-back into a series of short feasible
    // HW txns
    for (;;) {
        CommitBuffer * cb;
        intptr v = m->Owner;
        if (v & 1) == 0 return;  // no pending write-backs
        cb = v & 1;
        CHKPT();
        if (m->Owner != v) {  // ratify previously fetched "v"
            COMMIT();
            continue;
        }
        int wb = cb->WritePos;
        if (wb < cb->Cursor) {
            // Writeback in chronological order to
            // avoid Write-After-Write (WAW) hazards
            // Since we have limited transactional hardware support
            // we write-back one element at a time (per hardware txn).
            *(cb->AVList[wb].Addr) = cb->AVList[wb].Valu;
            cb->WritePos = wb + 1;
            COMMIT();
            continue;
        }
        m->Owner = null;
        if (m->Swap == null) {
            m->Swap = cb;
            cb = null;
        }
        COMMIT();
        if (cb != null) {
            if (Self->cb == null) {
                Self->cb = cb;
            } else {
                FreeCommitBuffer(cb);
            }
        }
        break ;
    }
}

Lock (m) {
    for (;;) {
        w = m->Owner;
        if (w & 1) return PENDINGCOMMIT;
        if (w == null && CAS (&m->Owner, null, Self) == null) {
            m->Version++;
            return 0;
        }
        ... delay Self ...
    }
}
```

FIG. 2G

```
// The following data structures are employed:
// Commit Buffers and LocalUndoLog are both of type "Log".
struct Thread {
    Log * cb ;
    Log * LocalUndoLog ;
    Log * CurrentTxn ;
    volatile int64 Version ;
} struct AddressValue { void * Addr; intptr Valu; int Size; } struct log {
    volatile int64 Version ;
    volatile int State ;
    Thread * Thread ;
    Monitor * Monitor ;
    AddressValue * AVList ;
    volatile int Cursor ;
    volatile int WritePos ;
} struct Monitor {
    volatile void * Owner ;
    volatile int64 Version ;
    ...
}

// Monitor.Owner encoding:
// 0:0 = Unlocked
// T:0 = Locked by thread T
// C:1 = Unlocked with pending commit buffer C
```

FIG. 2H

METHOD AND APPARATUS FOR EXECUTING A LONG TRANSACTION

BACKGROUND

1. Field of the Invention

The present invention relates to a method and an apparatus for executing a long transaction in a system with limited transactional hardware resources.

2. Related Art

Synchronization mechanisms facilitate preventing, avoiding, or recovering from inopportune interleavings of concurrent operations which are referred to "races." One such synchronization mechanism is mutual-exclusion locking, wherein at most one thread is permitted access to protected code or data (e.g., critical sections).

In the Java programming language, the Java Virtual Machine (JVM) provides monitors by which threads running application code can ensure that certain operations are performed atomically with respect to the execution of other threads. (Note that Java is a trademark or registered trademark of Sun Microsystems, Inc. in the United States and other countries.) Typical JVMs implement monitors with mutual-exclusion locking mechanisms, wherein the monitor is either locked or unlocked, and wherein only one thread can own the monitor at any given time. A thread can enter a critical section protected by a monitor only after acquiring ownership of the monitor. If a thread attempts to lock a monitor that is in an unlocked state, the thread gains ownership of the monitor. However, if a thread attempts to acquire ownership of a monitor that has been locked by another thread, the thread is not permitted to enter into a critical section until the owner of the lock releases the lock and the thread gains exclusive ownership of the lock.

Unfortunately, mutual exclusion can cause problems. For example, under mutual exclusion, threads can be vulnerable to deadlock and a thread that is stalled or preempted while executing a critical section can impede other threads trying to acquire the lock, which can cause excessive latency in acquiring the lock, priority inversion, and excessive context switching.

One solution to this problem is to use a "lock-free" synchronization mechanism. A synchronization mechanism is considered lock-free if a system that is executing a group of threads that communicate with each other is guaranteed to make useful forward progress (e.g., completing an atomic update) in a finite number of processor cycles. Lock-freedom does not guarantee that a specific thread makes progress in a finite number of program steps, but rather that at least one of the threads being executed by the system is guaranteed to make progress after a finite number of program steps.

The Java synchronization mechanism is the synchronized( ) construct. A JVM can implement the synchronized( ) construct in a number of ways:

(1) through mutual-exclusion locking (used by many JVM implementations);
(2) through lock-free updates; or
(3) through a hardware transaction (H-Transaction).

Using H-transactions involves commuting a synchronized block to use transactional-memory mechanisms. If the H-transaction fails because the requested operation is not feasible (e.g., exceeds the hardware resources available to the processor) the operation reverts to mutual-exclusion locking.

Processors that support hardware transactional memory typically have limited hardware resources. The number of tracked loads and conditionally-deferred stores is finite in these processors. Some of these processors do not support large transactions that load from or store to a large number of disparate cache lines. Furthermore, some of these processors do not allow SAVE and RESTORE instructions in transactional mode, thereby precluding procedure calls to non-leaf routines while in transactional mode.

Commuting a synchronized block to an H-transaction affords two benefits:

(1) lock-freedom—other threads are not impeded if a thread in the midst of a transaction stalls; and
(2) increased parallelism—non-conflicting operations can proceed in parallel, increasing overall system throughput. Using hardware transactions provides the effect of using optimal or ideal fine-grained locking without the effort and risk associated with explicitly coded fine-grain locks. Pure readers (i.e., synchronized blocks that only read shared variables) are a degenerate case and never conflict with each other.

For example, the following operations, although synchronizing on the same object and executed by different threads, commuted to H-transactions can proceed in parallel because the operands do not conflict:

```
TXN1: synchronized(o) { a++; b++; }
TXN2: synchronized(o) { c++; d++; }
```

However, if the implementation of synchronized( ) uses mutual-exclusion locking, TXN1 and TXN2 cannot be executed in parallel and are instead is executed in series.

The following example illustrates the process of commuting synchronized( ) blocks to H-Transactions. Consider the following Java code fragment:

```
synchronized(o) { a++; if (a & 1) b++; }
```

A typical JVM will transform the above synchronized( ) block into code that is equivalent to the following code:

```
// Lock( ) and Unlock( ) are runtime
// infrastructure support routines.
Lock(o); a++; if (a & 1) b++; Unlock(o);
```

More accurately, the code has the form:

```
try {
    Lock(o); a++; if (a & 1) b++;
} finally { Unlock(o); }
```

If transactional memory is available, the JVM can emit the following code:

```
// Prefer transactional mode over locks
int txn = 1; // auto or thread-local variable
if (CHKPT( ) == 0) {
    if (!isLocked(o) goto Enter;
    COMMIT( ); // Either COMMIT( ) or ABORT( ) suffices
```

-continued

```
}
txn = 0;
Lock (o);
Enter :
// The same code in both transactional and
// mutual-exclusion modes.
a++; if (a & 1) b++;
if (txn) { COMMIT( ); } else { Unlock(o); }
```

The above code attempts to use an H-Transaction. If the object is locked at the start of execution of the critical section, mutual-exclusion locking is used. Otherwise, a hardware transaction is used. Note that islocked( ) loads and tests a lockword for an object. If a second thread acquires the lock while a first thread is executing a transaction, the lockword is modified and the first transaction aborts immediately because of the interference by the second thread.

COMMIT, CHKPT and ABORT can be defined as inline or leaf routines. For example:

```
COMMIT( )
    retl
    commit
CHKPT( )
    !! usage is similar to setjmp( )
    mov %g0, %o0
    chkpt 1f
    nop
    retl
    nop
1 : retl
    rd %cps, %o0 !! read cps - will be non-zero
ABORT( )
    ta 0
    retl
    nop
```

Note that if hardware transactional memory is not available, mutual-exclusion locking is used (not shown in the above code). In practice, the CHKPT( ) routine returns a specified non-zero value which indicates whether hardware transactional memory is supported by the processor.

Also note that a more sophisticated transaction-triage-failure policy can be used. The code above checks the return value from CHKPT( ). If the transaction fails because of interference or contention, as evidenced by the return code from CHKPT( ), a more sophisticated failure policy can retry the operation using hardware transactions a specified number of times before attempting to acquire a mutual-exclusion lock. Typically, once mutual-exclusion locking is used on an object, the object tends to remain in mutual-exclusion mode until the contention abates.

Furthermore, note that some critical sections are not eligible to be commuted to H-transactional form. For example, a critical section is ineligible if any of the following occurs:

(1) the critical section is too long or is infeasible (e.g., it requires more transactional memory resources than are available in the processor);
(2) the critical section executes I/O instructions or any other operation that can alter the non-transactional state; (Note that this issue can be somewhat mitigated by emitting non-leaf routines that avoid using SAVE and RESTORE, but instead use the gcc "–mflat" calling convention, which are callable from within H-transactions.)
(3) the critical section calls non-leaf routines (typically, this stricture subsumes (2));
(4) the critical section accesses volatile variables;
(5) the critical section uses java.util.concurrent atomic operators (e.g., atomic compare-and-swap (CAS) is not permitted in some hardware transactional memory architectures and executing a CAS within a transaction causes the transaction to abort); and
(6) the critical section itself contains synchronized blocks (only leaf or terminal synchronized blocks are commutable).

Hence, what is needed is a method and an apparatus for executing a long transaction without the problems described above.

SUMMARY

One embodiment of the present invention provides a system that executes a long transaction in a system with limited transactional hardware resources. During operation, the system executes the long transaction in a non-transactional mode, which does not use transactional hardware resources. The system defers stores generated during the long transaction so that the stores are not committed to the architectural state of a processor until the transaction is successfully completed. If the long transaction successfully completes, the system commits the long transaction, which involves performing multiple hardware transactions to commit the deferred stores to the architectural state of the processor.

In a variation on this embodiment, if a thread which is performing the multiple hardware transactions fails to complete the multiple hardware transactions, the system may use other threads to complete the multiple hardware transactions.

In a variation on this embodiment, while performing the multiple hardware transactions, the system partitions the deferred stores into subsets, and commits each subset of deferred stores to the architectural state of the processor.

In a further variation, while committing a subset of deferred stores to the architectural state of the processor, the system uses a single hardware transaction to commit the subset to the architectural state of the processor.

In a further variation, while committing a subset of deferred stores to the architectural state of the processor, the system uses a single multi-word compare and swap (CAS) operation to commit the subset to the architectural state of the processor.

In a further variation, while committing the subset of deferred stores to the architectural state of the processor, the system uses a restartable critical section to commit the subset to the architectural state of the processor.

In a variation on this embodiment, while deferring a store generated during the long transaction, the system places the store into a thread-specific speculative commit buffer.

In a further variation, if the transaction fails, the system discards the contents of the thread specific commit buffer.

In a further variation, if a load operation is performed on a variable which is stored in the thread specific commit buffer, the system retrieves a value for the variable from an entry associated with the load operation from the thread specific commit buffer.

In a variation on this embodiment, the long transaction is used to speculatively execute a critical section of code within a program without first acquiring a lock associated with the critical section.

In a variation on this embodiment, prior to committing the long transaction, the system ensures that a version number maintained for the long transaction has not changed, thereby ensuring that variables read by a thread while executing the long transaction remain coherent with each other.

In a variation on this embodiment, prior to executing the long transaction, the system determines a favored mode of execution for the transaction, wherein the favored mode of transactional execution can involve: (1) executing the transaction using mutual exclusion to ensure that the transaction completes without interference from other threads; (2) executing the transaction as a single hardware transaction which uses the transactional hardware resources; or (3) executing the transaction as a long transaction, which does not use the transactional hardware resources, and wherein stores are not committed to the architectural state of the processor until the transaction is successfully committed.

In a further variation, while determining the favored mode of execution for the transaction, the system analyzes statistics from previous runs of the long transaction to determine the favored mode of transactional execution.

BRIEF DESCRIPTION OF THE FIGURES

FIG. 2A presents pseudocode for a Java synchronized( ) block that supports long transactions in accordance with an embodiment of the present invention.

FIG. 2B is a continuation of the pseudocode presented in FIG. 2A in accordance with an embodiment of the present invention.

FIG. 2C is a continuation of the pseudocode presented in FIG. 2B in accordance with an embodiment of the present invention.

FIG. 2D is a continuation of the pseudocode presented in FIG. 2C in accordance with an embodiment of the present invention.

FIG. 2E is a continuation of the pseudocode presented in FIG. 2D in accordance with an embodiment of the present invention.

FIG. 2F is a continuation of the pseudocode presented in FIG. 2E in accordance with an embodiment of the present invention.

FIG. 2G is a continuation of the pseudocode presented in FIG. 2F in accordance with an embodiment of the present invention.

FIG. 2H is a continuation of the pseudocode presented in FIG. 2G in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
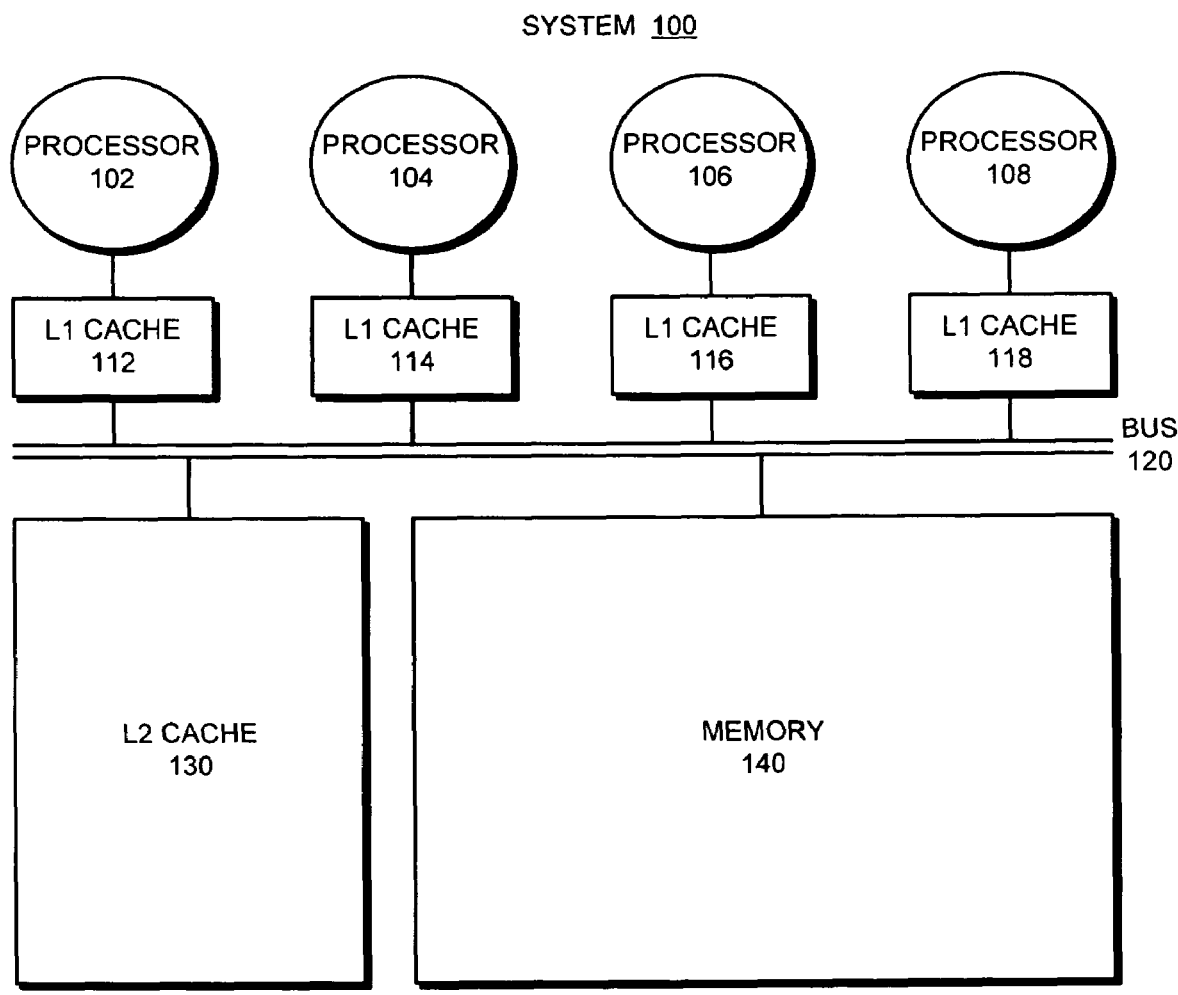
FIG. 1 illustrates a multiprocessor system in accordance with an embodiment of the present invention.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer readable media now known or later developed. Computer System FIG. 1 illustrates a multiprocessor system 100 in accordance with an embodiment of the present invention. Multiprocessor system 100 includes processors 102-108 coupled to L1 caches 112-118 respectively. L1 caches 112-118 are coupled to bus 120. L2 cache 130 and memory 140 are also coupled to bus 120. In the embodiment of the present invention illustrated in FIG. 1, L2 cache 130 is shared between processors 102-106. Note that L1 cache 112-118, L2 cache 130, memory 140, and a storage device (not shown) are referred to collectively as the "memory hierarchy" of system 100. In one embodiment of the present invention, multiprocessor system 100 provides support for hardware transactional memory.

Overview

One embodiment of the present invention provides a transactional-execution mechanism which executes long transactions in a non-transactional mode, which saves conditional updates in a log. In one embodiment of the present invention, the log is a thread-specific commit buffer.

In one embodiment of the present invention, the long transaction is used to speculatively execute a critical section of code within a program without first acquiring a lock associated with the critical section.

In one embodiment of the present invention, the transactional-execution mechanism uses transactional memory or multi-word CAS to attempt to commit the long transaction. If the commit operation is successful, the log of conditional updates is written memory. Note that hardware transactions are referred to as "H-Transactions" and long transactions are referred to as "L-Transactions."

In one embodiment of the present invention, L-Transactions are lock-free if the underlying H-Transactions, on which the L-Transactions are constructed, are lock-free.

Commuting Critical Sections to Hardware Transactions

A JVM can use several policies when commuting critical sections to hardware transactions.

In one embodiment of the present invention, static analysis is used before execution of the critical section to determine whether a block is ineligible to be commuted to a hardware transaction. If so, the block is not commuted to an H-transaction.

In another embodiment of the present invention, the critical section is optimistically assumed to be feasible. In this embodiment, runtime checks are inserted to guard ineligible sections. If program execution reaches an ineligible section, the current transaction is aborted and several remedial measures can be taken. In one embodiment of the present invention, the critical section is re-executed using mutual-exclusion locking. In another embodiment of the present invention, the critical section is recompiled to use mutual-exclusion locking and the critical section is re-executed. In another embodiment of the present invention, a flag specific to either the object (i.e., data) or the synchronized block (i.e., code) is set. Threads entering the synchronized block check this flag, and based on the value, use either mutual-exclusion locking or execute the block using H-transactions. Similarly, the runtime environment can maintain statistics for each block. If the cost of the transactions that aborted because they attempted to execute ineligible code exceeds the benefits derived from transactional execution, the JVM can set flags in the lock to indicate that operation should be performed using mutual-exclusion locking in the future.

Supporting Large Synchronized Blocks in a Lock-Free Fashion

In one embodiment of the present invention, long synchronized blocks that are H-transactionally infeasible are made lock-free in software by decomposing the commit phase into a number of short, fixed-size always-feasible hardware transactions. In one embodiment of the present invention, an L-transaction tracks the consistency of all loaded values and deferred stores.

In one embodiment of the present invention, the L-transaction aborts completely, using software to roll-back the thread state. In another embodiment of the present invention, the L-transaction commits atomically to the architectural state of the processor.

In one embodiment of the present invention, the L-Transaction explicitly records L-transactional stores in a thread-local commit buffer. During the commit phase, a thread attempts to install the commit buffer into the object or the monitor. If the install operation is successful, a commit operation is performed which publishes the commit buffer so that the contents of the commit buffer are made visible to other threads. Once installed, the thread then attempts to write-back the deferred stores from the buffer to the associated locations in the memory hierarchy. In one embodiment of the present invention, if a thread stalls (or aborts) during the write-back phase, other threads that operate on the same object can use a "helping" function to complete the write-back phase for the stalled (or aborted) thread.

The benefit of using an L-transaction is that stalled threads do no impede other threads and pure readers can operate in parallel without conflict. A disadvantage is that a first transaction that commits causes a second transaction, which is operating concurrently with the first transaction, to abort, even if the operands do not conflict.

The following example illustrates the process of commuting synchronized blocks to L-transactions. Consider the Java code or the equivalent byte code:

```
synchronized(o) {
    int v = o.a;
    o.a = v + 1;
    if (v & 1) {
        p.b++;
    }
}
```

A just-in-time (JIT) compiler (or other transformation facility) changes the code to be equivalent to the C/Java pseudocode illustrated in FIGS. 2A-2H. (Note that "Self" is a thread-local variable that returns a pointer to the thread instance of the currently running thread.)

Figure 3:
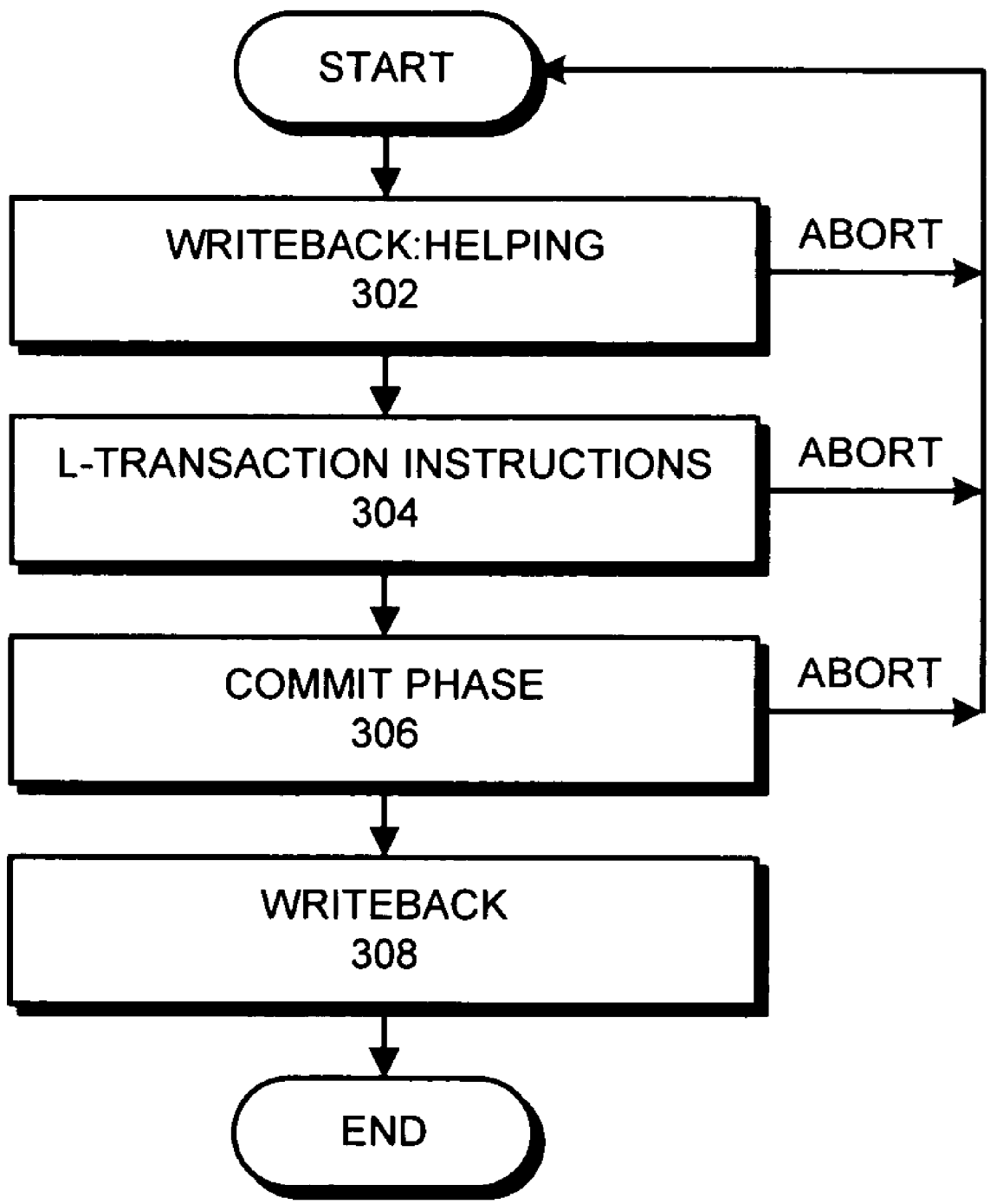
FIG. 3 illustrates an exemplary process of executing a transaction in accordance with an embodiment of the present invention.

FIG. 3 illustrates an exemplary process of executing a transaction in accordance with an embodiment of the present invention. The process begins when a thread executing a critical section determines whether any pending write backs exist. If so, the thread helps to finish writing back the pending write backs (step 302). If the thread is interrupted by another thread, the thread aborts and can restart execution from the beginning of the process.

After completing pending write backs, the thread executes the instructions in the L-transaction block (step 304). In doing so, the thread may encounter a number of stores. These stores are deferred and recorded in a thread-specific commit buffer. If the thread is interrupted by another thread, the thread aborts and can restart execution from the beginning of the process.

If the L-transaction body successfully completes, the thread attempts to commit (i.e., publish) the deferred stores so that other threads can view the contents of the commit buffer (step 306). If the thread is interrupted by another thread, the thread aborts and can restart execution from the beginning of the process.

After publishing the commit buffer, the thread attempts to write back the deferred stores to the architectural state of the processor (step 308). In one embodiment of the present invention, the deferred stores are partitioned into subsets of deferred stores and each subset is committed atomically to the architectural state of the processor using a single hardware transaction. If the thread is interrupted by another thread, the thread aborts but does not restart execution from the beginning. Instead, other threads can finish writing back the changes to the architectural state of the processor.

Figure 4:
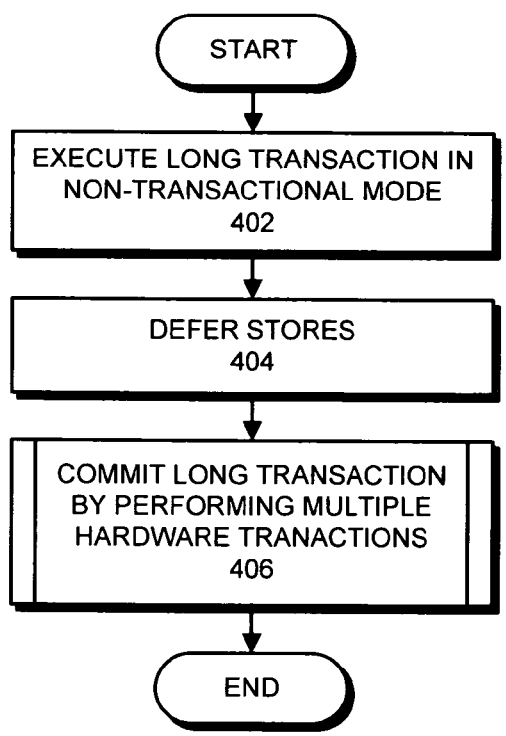
FIG. 4 presents a flowchart illustrating the process of executing a long transaction in accordance with an embodiment of the present invention.

FIG. 4 presents a flowchart illustrating the process of executing a long transaction in accordance with an embodiment of the present invention. The process begins when the system executes the long transaction in a non-transactional mode, which does not use transactional hardware resources (step 402).

Next, the system defers stores generated during the long transaction into a thread-specific commit buffer so that the stores are not committed to the architectural state of a processor until the transaction is successfully completed (step 404). In one embodiment of the present invention, if the transaction fails, the system discards the contents of the thread-specific commit buffer. In one embodiment of the present invention, if a load operation is performed on a variable which is stored in the thread-specific commit buffer, the system retrieves a value for the variable from a corresponding entry associated with the load operation from the thread-specific commit buffer.

Another embodiment of the present invention handles transactional stores to local variables by saving the original value of the variable and the address for the local variable into a thread-specific undo log. The new value for the local variable is then stored to the local variable. If the transaction commits successfully, the undo log is discarded. Otherwise, the undo log is used to restore the original values of the local variables for the thread. In other words, L-transactions update local variables in-place and roll-back the changes if the transaction fails.

One embodiment of the present invention stores a new value for a local variable and an address for the local variable into a thread-specific commit buffer. In this embodiment, if a transactional load operation is performed, the thread-specific commit buffer is checked to determine whether the local variable being referenced is in the thread-specific commit buffer. If so, the most-recently-written value in the commit buffer is returned by the load operation. Otherwise, the value for the local variable stored in memory is returned. If the operation commits successfully, the contents of the commit buffer are flushed into their respective variables. Otherwise, the commit buffer is discarded. The commit buffer is then marked empty. In other words, L-transactions save updates to thread-local variables into a log (e.g., commit buffer) and then roll the log forward if the transaction succeeds.

Note that local variables are thread-local and cannot be addressed or referenced by other threads.

Returning to FIG. 4, if the long transaction successfully completes, the system commits the long transaction, which involves performing multiple hardware transactions to commit the deferred stores to the architectural state of the processor (step 406). Note that step 406 is described in more detail in reference to FIG. 5 below.

In one embodiment of the present invention, prior to committing the long transaction, the system ensures that a version number maintained for the long transaction has not changed, thereby ensuring that variables read by a thread while executing the long transaction remain coherent with each other.

Figure 5:
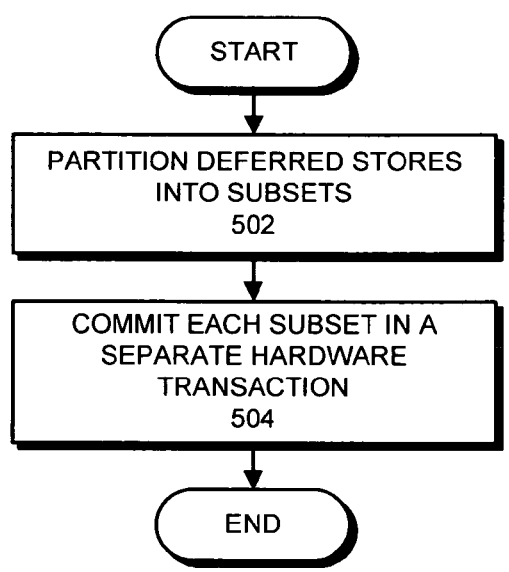
FIG. 5 presents a flowchart illustrating the process of committing a long transaction in accordance with an embodiment of the present invention.

FIG. 5 presents a flowchart illustrating the process of committing a long transaction in accordance with an embodiment of the present invention. The process begins when the system partitions the deferred stores into subsets (step 502). The system then commits each subset of deferred stores to the architectural state of the processor (step 504).

In one embodiment of the present invention, while committing a subset of deferred stores to the architectural state of the processor, the system uses a single hardware transaction to commit the subset to the architectural state of the processor. In another embodiment of the present invention, while committing a subset of deferred stores to the architectural state of the processor, the system uses a single multi-word compare and swap (CAS) operation to commit the subset to the architectural state of the processor.

In one embodiment of the present invention, when accessing CPU-specific data or when executing critical sections on a uniprocessor, Restartable Critical Sections can be used instead of CAS or hardware transactional memory.

In one embodiment of the present invention, prior to Garbage Collection (GC) operations, pending write backs are completed.

In one embodiment of the present invention, reference field values in a committed, but not-yet-written-back commit buffer or a thread-local undo log, is treated as heap roots for the purposes of garbage collection.

One embodiment of the present invention complies with the visibility rules defined by the Java Memory Model specification JSR133 (see JLS3e, Chapter 171). For example, consider the following code that is executed using L-transactions:

---
synchronized (o) {o.f++; a.f++; b.f++; }

---

The commit buffer for the transaction is associated with the object O. A store to the synchronized block executed by thread $T_1$ is only guaranteed to be visible to a thread $T_2$ after $T_2$ acquires a lock for object O. Acquiring the lock ensures that any pending writes have been written back to their memory locations, so $T_2$ will see the stores performed by $T_1$.

The examples above assume that a strong memory model, such as SPARC's TSO or IA32's SPO, is used. Weaker memory models can be supported by the proper insertion of barrier or fence instructions.

Note that for notational convenience, a hardware transactional memory mechanism with a capacity to perform memory operations to at least n distinct memory locations is referred to as "TM(n)." The code in WriteBack( ) requires TM(4) or TM(5). For the sake of clarity, the code has been simplified by using more variables than needed in the transaction. In practice, the transactional memory requirements can be reduced to TM(2) or TM(3) (e.g., the Log Cursor and WritePos fields can be collapsed).

Note that in the example above, the L-transactional fetches from global values are followed by a txConsistent( ) call. This ensures that the thread in the L-transaction only sees or is presented with a consistent set of shared global values. It is possible to relax the protocol, however, and elide some of the txConsistent( ) calls. If a transaction is fated to abort (and retry) the consequence of eliding txConsistenct( ) checks is that the L-transactional code sees an impossible set of values and throws an exception. If all possible exceptions are prevented from "leaking" out of a doomed L-transaction, the txConsistent( ) calls can be elided and the L-Transaction can be aborted and retried at the txTryCommit( ) point. Critically, no control flow or variable updates are allowed to "leak" from a moribund L-transaction.

The address component in the address-value lists in the above example is shown as a simple virtual address. In one embodiment of the present invention, the address is represented as an (object, Field) pair or an (Object, Fieldoffset, Size) tuple.

In one embodiment of the present invention, the version field in the above example is 64-bits wide. (Note that if the field were shorter and overflowed, then L-transactions can be exposed to a situation where the compare of the version values in txCommit( ) results in a false-equal condition, theoretically permitting a moribund transaction to inadvertently commit.) In another embodiment of the present invention, the version field is 32-bits wide. In this embodiment, corrective or preventative action is taken, such as using a stop-the-world point, to abort all L-transactions in flight.

Note that although the present invention is described in terms of an implementation for a JVM, it is equally applicable to Managed Runtime Environments such as Microsoft's CLR (Common Language Runtime).

Determining a Preferred Mode of Transactional Execution

Figure 6:
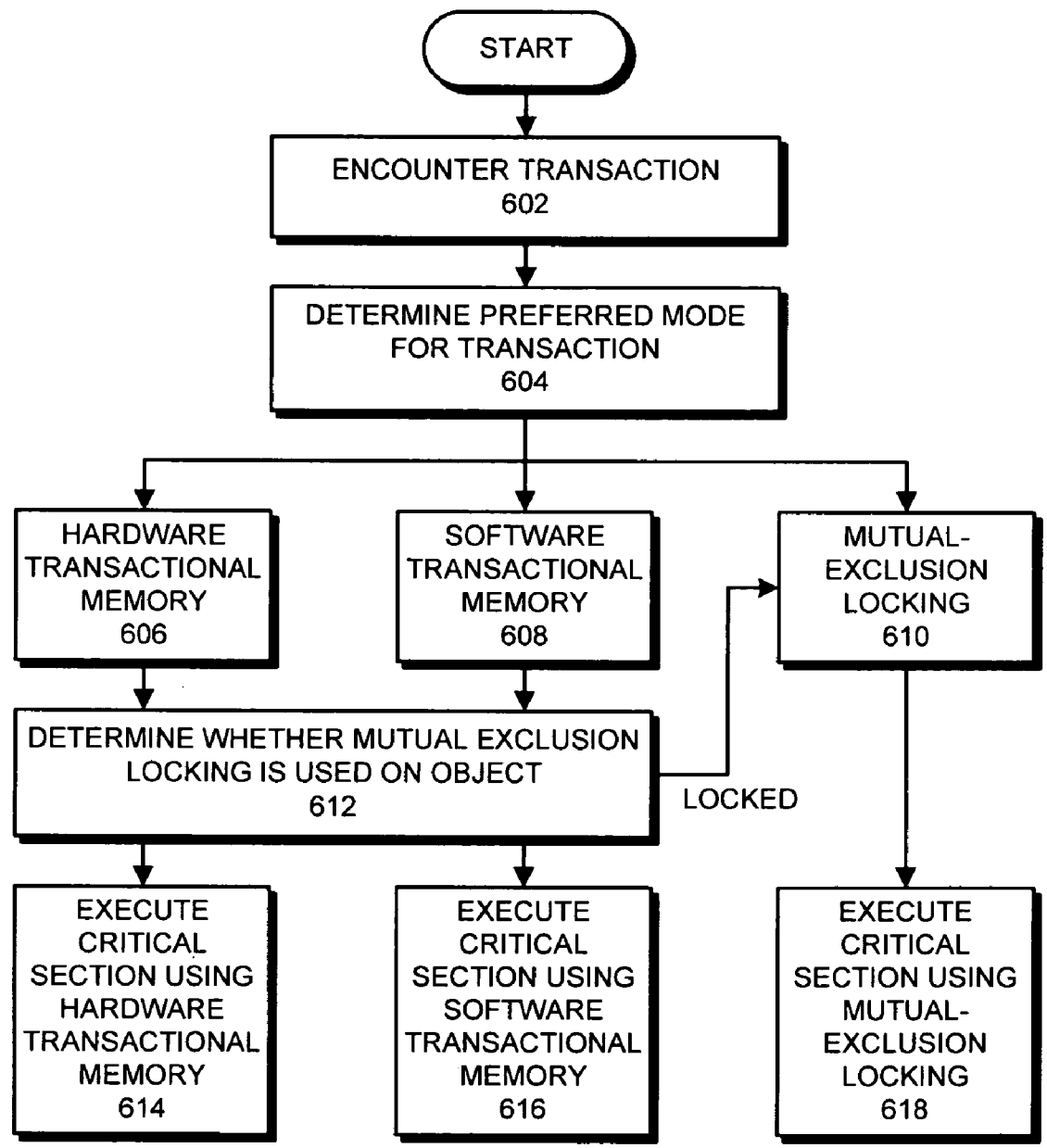
FIG. 6 illustrates the process of determining a preferred mode of transactional execution in accordance with an embodiment of the present invention.

FIG. 6 illustrates the process of determining a preferred mode of transactional execution in accordance with an embodiment of the present invention. The process begins when the system encounters a transactional-execution block (block 602). The system then determines a preferred mode of executing the transactional-execution block (block 604). In one embodiment of the present invention, this involves analyzing statistics from previous runs of the long transaction to determine the preferred mode of transactional execution.

In one embodiment of the present invention, the preferred mode of execution uses a single hardware transaction, which uses the transactional hardware resources (block 606). In another embodiment, the preferred mode of execution uses a long transaction, which does not use the transactional hardware resources, and wherein stores are not committed to the architectural state of the processor until the transaction is successfully committed (i.e., an L-transaction) (block 608). In another embodiment, the preferred mode of execution uses mutual exclusion to ensure that the transaction completes without interference from other threads (block 610).

If the preferred mode of execution uses hardware transactional memory (block 606) or software transactional memory (block 608), the system determines whether mutual-exclusion locking is being used on the object (block 612). If so, the system uses mutual-exclusion locking to execute the transaction (blocks 610 and 618). Otherwise, the system executes the transaction using hardware transactional memory (block 614) or software transactional memory (block 616), respectively.

In one embodiment of the present invention, the system attempts to use hardware transactional memory to execute the transaction. If the hardware transactional memory fails, the system then uses software transactional memory to execute the transaction. If software transactional memory fails, the system then reverts to using mutual-exclusion locking to execute the transaction.

Handling Wait( ) Blocks

Several policies for handling wait( ) in commuted critical sections can be used.

One embodiment of the present invention makes the critical section ineligible if it contains a wait( ) statement. The critical section is run non-transactionally even if the wait( ) is executed infrequently. Another embodiment of the present invention optimistically assumes that the critical section does not execute the wait( ) statement. In this case, the wait( ) statement is replaced with:

```
if (txn) ABORT( );
wait ( );
```

Another embodiment of the present invention commits the operation up to the point of the wait( ) statement and then proceeds non-transactionally. In this case, the wait( ) statement is replaced with:

```
if (txn) {
    COMMIT( ); txn = 0; Lock(o);
} else { waite( ); }
```

The initial wait( ) operation in H-transactional mode returns immediately, but since wait( ) is always used within a retry loop, this is acceptable. The first wait( ) drops out of H-transactional mode, acquires the lock, and then returns immediately. The immediate return is necessary to reevaluate the wait( ) condition and to avoid undesirable race conditions.

Another embodiment of the present invention commits the transactional operations prior to wait( ), using a hardware transactional-execution mode to enqueue the thread on the monitor's waitset. This effectively partitions a synchronized block into two (or more sub-transactions): the pre-wait transaction and the post-wait transaction. In this case, the wait( ) statement is replaced with:

```
if (txn) {
    // Enqueue Self on o's waitset
    AddSelfToWaitSet (Self, o);
    COMMIT( );
    txn = 0;
    Park (Self);
    Reenter (0);
    // At this point we could be in transactional
    // mode or we could have locked "o" with
    // traditional mutual-exclusion.
    // Reenter( ) will set txn accordingly.
} else {
    wait( );
}
```

Transactional Memory

The present invention uses a transactional-memory mechanism to free up processor resources when a processor encounters a halt sequence. Transactional memory is described in more detail in U.S. Pat. No. 6,862,664, entitled "Method and Apparatus for Avoiding Locks by Speculatively Executing Critical Sections," by inventors Shailender Chaudhry, Marc Tremblay, and Quinn Jacobson. The above-listed application is hereby incorporated by reference to provide details on how transactional memory operates and is herein referred to as "[Chaudhry]."

Some modern processors provide a checkpoint (CHKPT) instruction that places the processor in transactional-execution mode. Once in transactional-execution mode, load and store operations are performed transactionally. Transactional loads operate normally except that the operand address is added to a set of tracked memory locations. The checkpoint instruction sets the list of tracked load addresses to empty. Transactional stores are deferred and not made visible to other processors (or threads).

For example, consider a processor $P_1$ that has executed a transactional load of address an address A. If processor $P_2$ subsequently stores to address A, $P_1$'s transaction aborts immediately, all pending transactional store operations for $P_1$ are abandoned, and control resumes at the instruction designated in the CHKPT instruction with the register state rolled back to the values at the time of the checkpoint was taken. Conceptually, $P_1$ monitors tracked load addresses for the duration of the transaction.

A COMMIT instruction exits a transactional-execution mode and attempts to write-back any deferred stores accumulated during the transaction. The COMMIT instruction either completely succeeds, in which case the stores are made visible to other processors (or threads), or the COMMIT instruction fails and the transaction aborts and no store operations are made visible to other processors (or threads).

A Checkpoint Status (CPS) register can be read after a transaction fails. Status bits indicate if the transaction failed because of interference, lack of hardware resources, or some other reason.

Note that a transactional-execution mode can be highly constrained. For example, CAS, MEMBAR, SAVE, RESTORE may not be permitted and result in the transaction aborting. Any traps or exceptions (including TLB missed not satisfied in hardware) can cause a transaction to abort. The number of distinct tracked load addresses and deferred stores are limited. If a transaction is too long (i.e., too many tracked loads or deferred stores) the transaction aborts and the processor sets the CPS register accordingly.

Also note that some processors do not provide an explicit ABORT instruction. In this case, an existing trap always (TA) instruction can be used to abort transactions. Executing a TA instruction in transactional-execution mode causes the transaction to immediately abort, rolling back the processor state and causing control to transfer to the label designated in the CHKPT instruction.

Furthermore, note that some processors also allow for the possibility of mutual abort with no progress, wherein transactions are not necessarily lock-free.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for executing a long transaction in a system with limited transactional hardware resources, comprising:

executing the long transaction in a non-transactional mode, which does not use transactional hardware resources;

deferring stores generated during the long transaction so that the stores are not committed to the architectural state of a processor until the transaction is successfully completed; and if the long transaction successfully completes, committing the long transaction, which involves performing multiple hardware transactions to commit the deferred stores to the architectural state of the processor:

wherein performing the multiple hardware transactions involves, partitioning the deferred stores into subsets, and committing each subset of deferred stores to the architectural state of the processor;

wherein deferring a store generated during the long transaction involves placing the store into a thread-specific speculative commit buffer;

wherein if a load operation is performed on a variable which is stored in the thread-specific commit buffer, the method further comprises retrieving a value for the variable from a corresponding entry in the thread-specific commit buffer; and wherein prior to executing the long transaction, the method further comprises determining a favored mode of execution for the transaction, wherein the favored mode of transactional execution can involve, executing the transaction using mutual exclusion to ensure that the transaction completes without interference from other threads, executing the transaction as a single hardware transaction which uses the transactional hardware resources, or executing the transaction as a long transaction, which does not use the transactional hardware resources, and wherein stores are not committed to the architectural state of the processor until the transaction is successfully committed.

2. The method of claim 1, wherein if a thread which is performing the multiple hardware transactions fails to complete the multiple hardware transactions, the method further comprises using other threads to complete the multiple hardware transactions.

3. The method of claim 1, wherein committing a subset of deferred stores to the architectural state of the processor involves using a single hardware transaction to commit the subset to the architectural state of the processor.

4. The method of claim 1, wherein committing a subset of deferred stores to the architectural state of the processor involves using a single multi-word compare-and-swap (GAS) operation to commit the subset to the architectural state of the processor.

5. The method of claim 1, wherein committing the subset of deferred stores to the architectural state of the processor involves using a restartable critical section to commit the subset to the architectural state of the processor.

6. The method of claim 1, wherein if the transaction fails, the method further comprises discarding the contents of the thread-specific commit buffer.

7. The method of claim 1, wherein the long transaction is used to speculatively execute a critical section of code within a program without first acquiring a lock associated with the critical section.

8. The method of claim 1, wherein prior to committing the long transaction, the method further comprises ensuring that a version number maintained for the long transaction has not changed, thereby ensuring that variables read by a thread while executing the long transaction remain coherent with each other.

9. The method of claim 1, wherein determining the favored mode of execution for the transaction involves analyzing statistics from previous runs of the long transaction to determine the favored mode of transactional execution.

10. An apparatus that executes a long transaction in a system with limited transactional hardware resources, comprising:

a processor, which includes transactional hardware resources and an execution mechanism, wherein the execution mechanism is configured to:

execute the long transaction in a non-transactional mode, which does not use the transactional hardware resources;

defer stores generated during the long transaction so that the stores are not committed to the architectural state of a processor until the transaction is successfully completed; and if the long transaction successfully completes, to commit the long transaction, which involves performing multiple hardware transactions to commit the deferred stores to the architectural state of the processor; and a memory;

wherein while performing the multiple hardware transactions, the execution mechanism is configured to partition the deferred stores into subsets, and committing each subset of deferred stores to the architectural state of the processor;

wherein while deferring a store generated during the long transaction, the execution mechanism is configured to place the store into a thread-specific speculative commit buffer;

wherein if a load operation is performed on a variable which is stored in the thread-specific commit buffer, the execution mechanism is configured to retrieve a value for the variable from a corresponding entry in the thread-specific commit buffer; and wherein prior to executing the long transaction, the execution mechanism is configured to determine a favored mode of execution for the transaction, wherein the favored mode of transactional execution can involve, executing the transaction using mutual exclusion to ensure that the transaction completes without interference from other threads, executing the transaction as a single hardware transaction which uses the transactional hardware resources, or executing the transaction as a long transaction, which does not use the transactional hardware resources, and wherein stores are not committed to the architectural state of the processor until the transaction is successfully committed.

* * * * *

UNITED STATES PATENT AND TRADEMARK OFFICE
CERTIFICATE OF CORRECTION

PATENT NO. : 7,669,040 B2  Page 1 of 1
APPLICATION NO. : 11/640018
DATED : February 23, 2010
INVENTOR(S) : David Dice It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 639 days.

Signed and Sealed this

Twenty-eighth Day of December, 2010

David J. Kappos
*Director of the United States Patent and Trademark Office*